Aug. 11, 1964     H. W. CROMIE     3,143,742
PROSTHETIC SUTURELESS HEART VALVE
Filed March 19, 1963     2 Sheets-Sheet 1

INVENTOR.
HARRY W. CROMIE
BY Brown, Critchlow, Flick & Peckham
ATTORNEYS.

Aug. 11, 1964   H. W. CROMIE   3,143,742
PROSTHETIC SUTURELESS HEART VALVE
Filed March 19, 1963   2 Sheets—Sheet 2

INVENTOR.
HARRY W. CROMIE
BY
Brown, Critchlow, Flick & Peckham
ATTORNEYS.

United States Patent Office 3,143,742
Patented Aug. 11, 1964

1

3,143,742
PROSTHETIC SUTURELESS HEART VALVE
Harry W. Cromie, Pittsburgh, Pa., assignor to Surgitool
Incorporated, a corporation of Pennsylvania
Filed Mar. 19, 1963, Ser. No. 266,272
7 Claims. (Cl. 3—1)

This invention relates to cardiac surgery, and more particularly to prosthetic valves for the heart.

Cardiac surgery has advanced so far that it now is not uncommon to completely replace an aortic valve or a mitral valve with a prosthetic valve. However, the conventional method of fastening such a valve in place, which is by suturing, is a long and tedious process requiring from one to two hours of extracorporeal perfusion. The prolonged period of cardiopulmonary bypass and protection of the heart by coronary perfusion or reduced temperatures is highly undesirable. Furthermore, up until now a cloth cuff has been required, by which the sutures can affix the artificial valve to the heart tissue, with the result that the cloth and numerous sutures are frequently the site of the initial nidus of thrombus formation.

It is among the objects of this invention to overcome these objections by providing a valve which can be fixed in place mechanically in only a few minutes, which eliminates the need for sutures, which does not require prolonged cardiopulmonary bypass and coronary perfusion, which greatly reduces the hazard of thrombus formation, and which greatly reduces the operative morbidity or mortality.

In accordance with this invention my heart valve includes a pair of coaxial and relatively movable rings that support a valve seat, with which a movable check valve member cooperates. The outer portion of at least one of the rings is provided with a plurality of circumferentially spaced radial passages through it. Slidably disposed in these passages are the pointed outer end portions of a plurality of curved pins, the inner ends of which are pivotally mounted on transverse axes in the other ring. The rings are so related that when they are moved in a predetermined direction relative to each other the pins are projected from the passages to pierce the heart tissue around the valve and hook themselves into it in order to hold the valve in place.

The preferred embodiment of the invention is illustrated in the accompanying drawings, in which—

Figure 2:
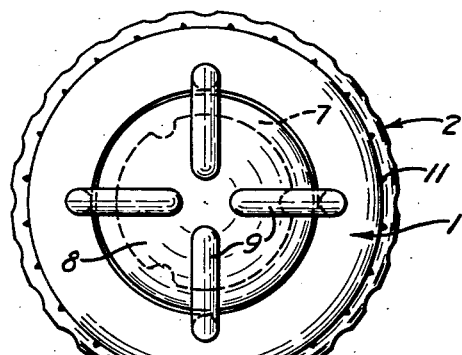
Figure 1:
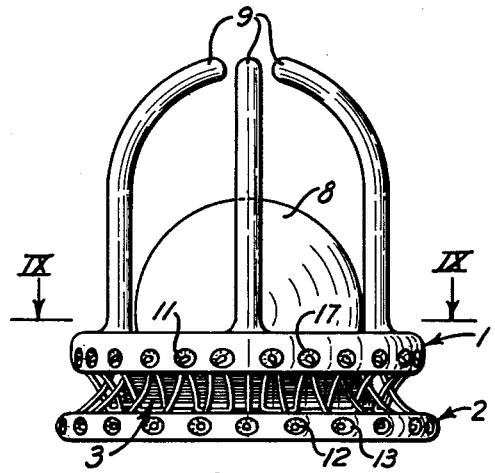
Figure 3:
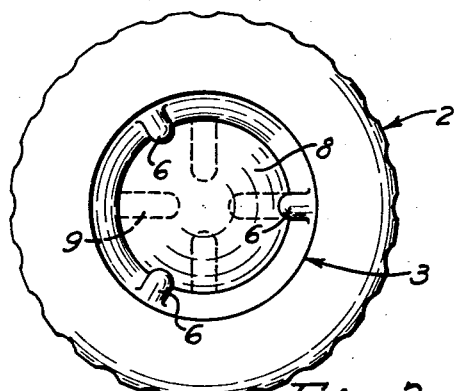
Figure 5:
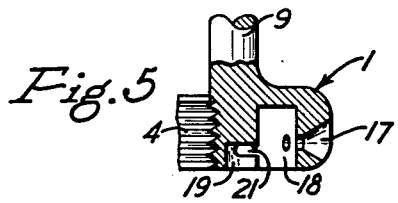
Figure 6:
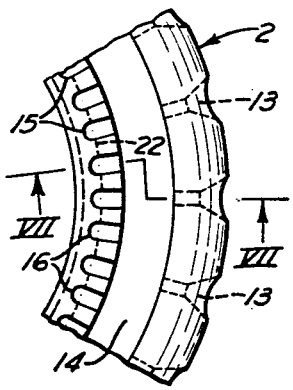
Figure 4:
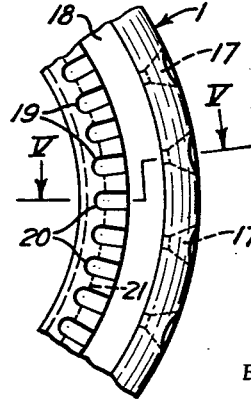
Figure 7:
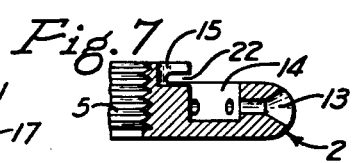
Figure 8:
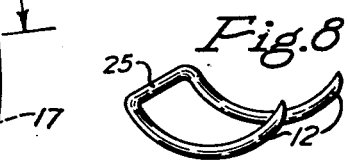
Figure 9:
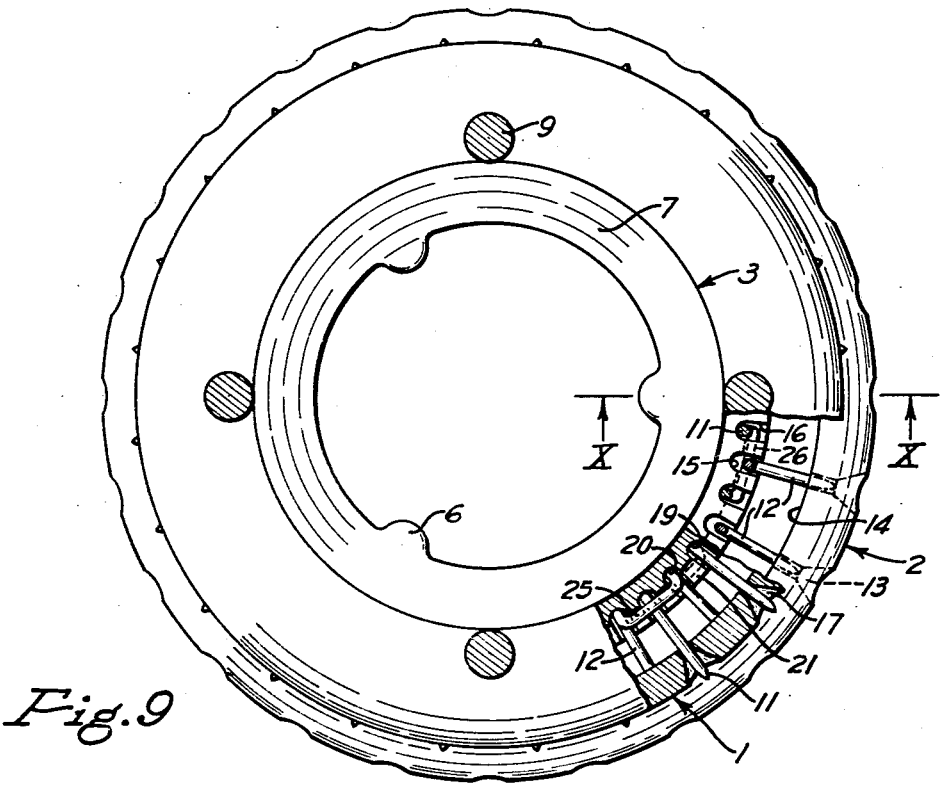

FIG. 1 is a greatly enlarged side view of the valve as it would appear resting on a support before use;
FIG. 2 is a plan view of the valve as shown in FIG. 1;
FIG. 3 is a bottom or inlet end view thereof;
FIG. 4 is an enlarged fragmentary bottom view of the upper or outlet ring of the valve;
FIG. 5 is a vertical section taken on the line V—V of FIG. 4;
FIG. 6 is an enlarged fragmentary plan view of the lower or inlet ring;
FIG. 7 is a vertical section taken on the line VII—VII of FIG. 6;
FIG. 8 is a perspective view of one of the double pin elements;
FIG. 9 is a further enlarged horizontal section taken on the line IX—IX of FIG. 1 without the ball but with portions of the inlet and outlet rings broken away to show the outlet ring in section and the inlet ring in plan;

2

Figure 10:
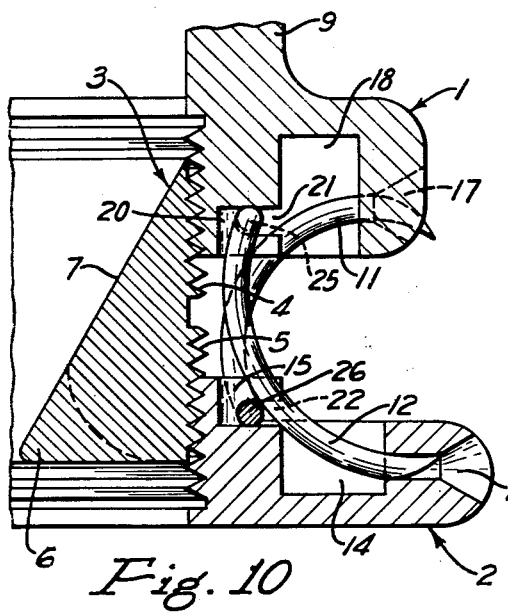
Figure 11:
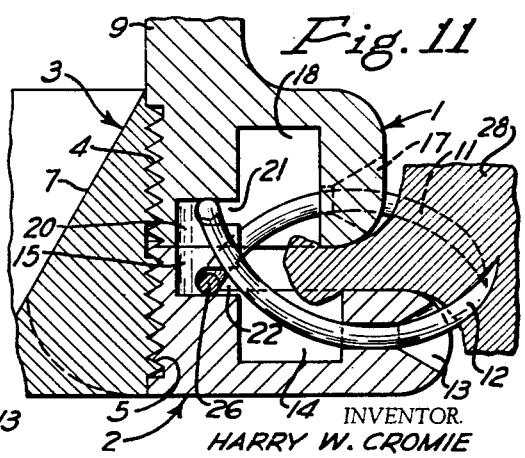

FIG. 10 is a still further enlarged fragmentary vertical section taken on the line X—X of FIG. 9; and
FIG. 11 is a view similar to FIG. 10, but showing the valve mounted in a heart.

Although the position of the valve in use will vary, depending on whether it replaces an aortic valve or a mitral valve, it will be described herein in the upright position shown in FIG. 1 for ease of illustration. The valve in this figure is ready for insertion in a heart. It will be seen that the body of the valve is formed from three coaxial rings, consisting of two outer rings 1 and 2 and an inner ring 3. Ring 2 is at the inlet and ring 1 at the outlet of the valve. The two outer rings are spaced apart vertically and encircle the opposite ends of the inner ring. When the valve is used to replace an aortic valve, the inlet ring should be smaller than the outlet ring. The inner ring is rotatably mounted in the outer rings and is screwed into at least one of them so that when it is turned in a clockwise direction it will pull the two outer rings together. That can be done most rapidly if the inner ring is provided with right and left-hand threads 4 and 5 as shown in FIGS. 10 and 11, onto which the outer rings are screwed so that when the inner ring is turned the two outer rings will be moved toward each other. For turning the inner ring, it may be provided at the bottom with a plurality of lugs 6 (FIG. 3) that can be engaged by a suitable tool.

The rings support a check valve, such as a ball and seat, although other types of check valve members may be used, such as flaps or cusps. Most conveniently, the seat 7 (FIGS. 9, 10 and 11) is formed in the inner ring by tapering its inner surface downwardly when a ball 8 is to be used as the check valve member. In that case, a cage for retaining the ball may be formed by providing the upper ring with upwardly extending rods 9 that curve over the top of the ball.

The principal feature of this invention is that this valve can be very quickly fastened in place mechanically without the use of sutures. Accordingly, it is provided with a plurality of curved pins that are projected radially from at least one of the outer rings in order to pierce the surrounding heart tissue when the two outer rings are drawn toward each other. Preferably, there are two series of pins, an upper series 11 and a lower series 12. Each series is pivotally mounted in a different outer ring and slidably mounted in the other one so that the upper and lower pins cross each other. More specifically, the inlet ring 2 is provided with a plurality of circumferentially spaced short radial passages 13, the outer ends of which are exposed around the periphery of the ring. The inner ends of these passages communicate with the space between the outer rings. Preferably, this is accomplished by providing the inlet ring with a downwardly extending annular groove 14, into the outer side of which the inner ends of the passages open. The ring extends above the inner side of the groove and this raised portion is provided with an inwardly and downwardly extending radial slot 15 opposite each passage 13 as shown in FIGS. 6, 7, 9 and 10. Between each pair of these slots there is a similar slot 16. The outlet ring 1 is provided in the same general way with a plurality of radial passages 17, but they are staggered relative to those in the inlet ring so that they are disposed between them. At the inner ends of these upper passages there is an upwardly extending annular groove 18, from the lower inner side of which a plurality of radial slots extend inwardly and upwardly. As shown in FIGS. 4, 5, 9 and 10, these slots are directly above those in the lower ring, slots 19 being above slots 16, and slots 20 being above slots 15. The grooves and slots form recesses at the inner ends of the radial passages, with the recesses in the upper ring facing those in the lower ring. All of the thin vertical walls between the slots in each ring are provided with inwardly extending notches, notches 21 being in the upper ring and notches 22 in the lower ring.

Disposed in each lower passage 13 is the pointed outer end portion of a pin 12 curved in a vertical plane. As shown in FIG. 10, the pin extends inwardly from the passage, across the adjoining groove 14 and then curves up through the adjacent slot 15 and across the space between the upper and lower rings and into a slot 20 in the upper ring. The upper or inner end of this pin has a laterally bent portion that extends into one of the notches 21 beside it to hold the pin in place and yet permit it to swing in a vertical plane. Preferably, the pins are made in pairs, with their laterally projecting portions formed by a single cross piece 25 that is integral with both pins, so that the element is U-shape as shown in FIG. 8. The cross piece extends through two notches 21 because the two pins are spaced apart by a slot 16. Like pairs of curved pins are mounted in the other passages in the lower ring and are pivoted in notches 21 in the upper ring. Also, similar curved pairs of pins 11 have their pointed end portions slidably mounted in passages 17 in the upper ring, from which they extend inwardly across the adjoining annular groove 18 and curve down through upper slots 19 and across the space between the two rings. The lower or inner end portions of these pins extend down into slots 16 in the lower ring between pins 12, and their integral cross pieces 26 are pivotally retained in notches 22 in the side walls of these slots. It will therefore be seen that the upper series of pins are staggered relative to the lower series, and that the inner portions of the upper and lower pins cross each other between the rings. The annular grooves 14 and 18 aid in inserting the cross pieces of the pins in notches 21 and 22. If desired, the lower walls of notches 21 may be bent upwardly, and the upper walls of notches 22 bent downwardly, to positively lock the pins in the notches.

After a defective valve has been excised from a heart, the valve disclosed herein is inserted in place of the removed valve. There will be a ring of tissue around the passage formerly occupied by the excised valve, and this artificial valve will be inserted in the passage far enough for that tissue to be located between outer rings 1 and 2. The inner ring 3 then is rotated by its lugs 6 to pull the two outer rings toward each other to clamp the tissue 28 between them as shown in FIG. 11. As they move together, the rings force the two series of pins to swing toward each other on their inner ends and move their pointed outer ends out of the radial ring passages and simultaneously toward each other. As they do this, the pointed ends pierce the intervening ring of tissue and embed themselves in it. Preferably, the pins are long enough for the outer ends of the lower pins to cross the pointed ends of the upper pins to some extent. The tissue is sealed between the outer rings of the valve, and since the pins extend into the tissue all around the valve the latter is held firmly, safely and permanently in place. The operation of fastening the valve in place in this manner is performed very quickly, because all of the pins are moved simultaneously.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A heart valve comprising a pair of coaxial and relatively movable rings, a valve supported by the rings, the outer portion of a ring being provided with a plurality of circumferentially spaced radial passages therethrough, and a plurality of curved pins having pointed outer end portions slidably disposed in said passages, the inner ends of the pins being pivotally mounted on transverse axes in the other ring, whereby when the rings are moved in a predetermined direction relative to each other the pins are projected from said passages into tissue-piercing position.

2. A heart valve comprising a pair of axially spaced outer rings, an inner ring rotatably mounted in said outer rings and provided with screw threads for moving an outer ring toward the other outer ring when the inner ring is turned in a predetermined direction, one of the rings being provided with a valve seat, a movable check valve member for the seat, an outer ring being provided with a plurality of circumferentially spaced radial passages having exposed outer ends and having inner ends communicating with the space between the outer rings, curved pins having pointed outer end portions slidably disposed in said passages, the pins curving inwardly from said passages and across said space, and the inner ends of the pins being pivotally mounted on transverse axes in the outer ring opposite to the ring containing their pointed outer ends, whereby the pointed outer ends of the pins are moved outwardly away from said passages and toward the other outer ring into tissue-piercing position when said inner ring is turned in said predetermined direction.

3. A heart valve according to claim 2, in which said pins are integrally connected in pairs by a cross piece at the inner ends of each pair.

4. A heart valve according to claim 2, in which said opposite outer ring is provided with notches and the inner ends of the pins are provided with laterally projecting portions pivotally retained in said notches.

5. A heart valve comprising a pair of axially spaced outer rings, an inner ring rotatably mounted in said outer rings and provided with screw threads for moving an outer ring toward the other outer ring when the inner ring is turned in a predetermined direction, one of the rings being provided with a valve seat, a movable check valve member for the seat, each outer ring being provided with a plurality of circumferentially spaced radial passages having exposed outer ends and having inner ends communicating with the space between the outer rings, and two series of curved pins having pointed outer end portions slidably disposed in said passages, the pins curving inwardly from said passages and across said space, and the inner ends of each series of pins being pivotally mounted on transverse axes in the outer ring opposite to the ring containing their outer ends, whereby the portions of the two series of pins between the outer rings across one another and their pointed outer ends are moved outwardly away from said passages and toward one another into tissue-piercing position when said inner ring is turned to screw the outer rings together.

6. A heart valve according to claim 5, in which said inner ring is provided with right and left-hand external screw threads, and said outer rings are screwed onto the opposite ends of the inner ring.

7. A heart valve comprising a manually rotatable inner ring provided with a valve seat and right and left-hand external screw threads, a movable check valve member for said seat, a pair of axially spaced outer rings screwed onto the opposite ends of the inner ring, the outer portion of each outer ring being provided with a plurality of circumferentially spaced radial passages therethrough, the inner portion of each outer ring having a recess therein at the inner end of each passage and facing the other outer ring, and two series of curved pins having pointed outer end portions slidably disposed in said passages, the pins extending from said passages inwardly in the adjoining recesses and then curving across the space between the outer rings, and the inner ends of each series of pins being pivotally mounted on transverse axes in the outer ring opposite to the ring containing their outer ends, whereby the portions of the two series of pins between the outer rings cross one another and their pointed outer ends are moved outwardly away from said passages and toward one another into tissue-piercing position when said inner ring is turned to screw the outer rings together.

References Cited in the file of this patent

UNITED STATES PATENTS

| | | |
|---|---|---|
| 709,392 | Brown | Sept. 16, 1902 |
| 2,638,901 | Sugarbaker | May 19, 1953 |
| 3,068,869 | Shelden | Dec. 18, 1962 |
| 3,130,419 | Edwards | Apr. 28, 1964 |